Patented June 10, 1941

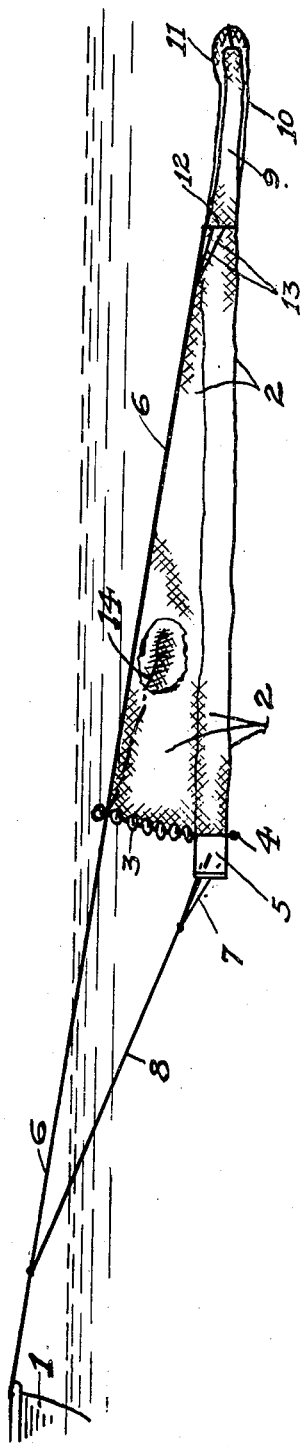
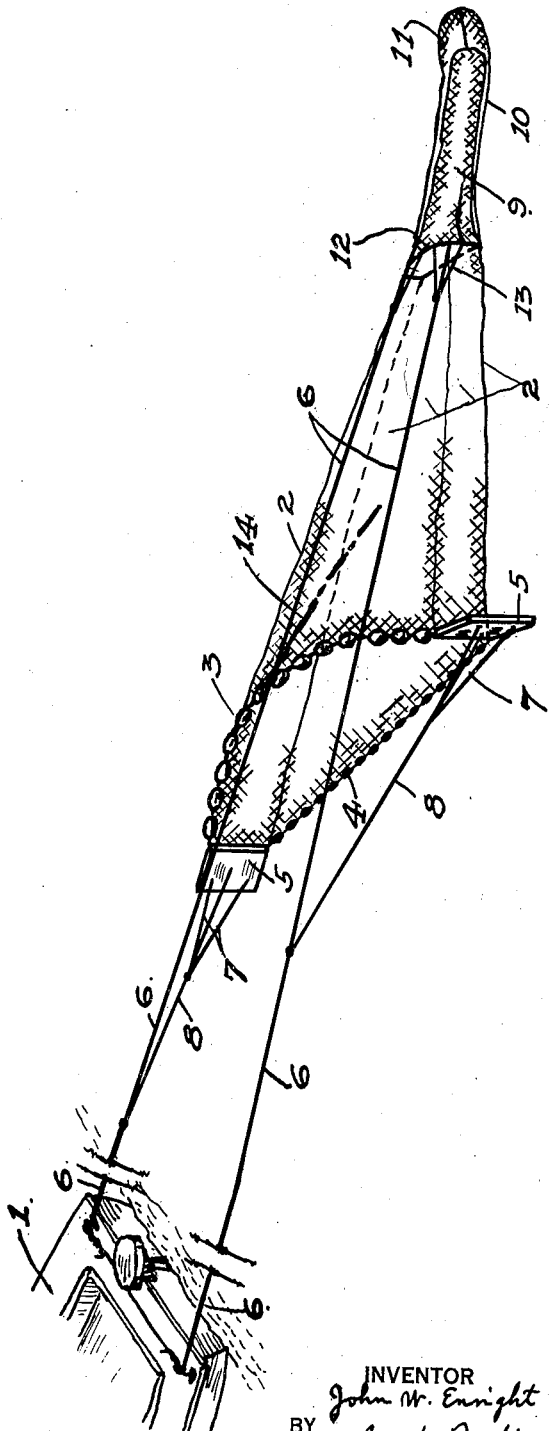

2,244,907

UNITED STATES PATENT OFFICE 2,244,907

SHRIMP-TRAWLING DEVICE

John W. Enright, New Orleans, La.

Application January 23, 1941, Serial No. 375,599

6 Claims. (Cl. 43—9)

My invention relates to improvements in shrimp-trawling devices. One object of the invention is the provision of a trawl, so constructed and arranged, that the customary strain or drag on the trawl-webbing caused by the weight of the catch lodged in the tail or bag of the trawl, and the pressure of water against this trapped catch is eliminated, thus insuring a greater opening to the meshes of the webbing, to allow the proper evacuation of the water entering the net and thereby reduce the resistance to travel.

Another object of the invention is the provision of a device of this character that will allow the trawl-boards to spread the trawl mouth open horizontally to its full working capacity, a function they are designed to perform.

Another object of the invention is the provision of a device of this character which provides means for vertically opening the trawl mouth to a much greater extent than has heretofore been accomplished.

Another object of this invention is the provision of a suspended net barrier located inside the trawl, so as to prevent the escape of the entrapped catch after they have entered the trawl.

Another object of this invention is the provision of an outer tail to constitute a means for preventing pocketing of the trawl-webbing in front of an inner bag or tail.

The novel features which I believe to be characteristic of my invention are set forth with particularity in the appended claims. This invention itself, however, both as to organization and method of operation, together with additional objects and advantages thereof, will be best understood from the following description of a specific embodiment, when read in connection with the accompanying drawing, in which, Fig. 1 is a side elevational view of the device.

Fig. 2 is a perspective view.

Referring to the drawing, the numeral 1 designates a towing boat which may be a power-boat of any type so as to properly pull or tow a trawling net 2. This trawling device comprises an elongated or rectangular in cross-section funnel shaped net having at the forward upper end thereof a cork-line 3, and at the forward lower end thereof a lead-line 4. Attached to each side of the mouth of the trawl-net, are the usual trawl-boards 5, which are inclined slightly forwardly thereof, as indicated in the drawing, during towing of the apparatus. Two tow-lines 6 are connected at their forward or upper ends, to the towing boat 1 and at their rear or lower ends to the rear end of the trawl designated as an inner tail or bag 9, which is closed at its rear end to hold the entrapped catch. The tow-lines 6 are carried from the inner tail of the trawl to the tow-boat from the inside of the trawl and passed under the cork line 3.

An outer tail 10 is connected to the trawl-webbing at its forward end and to the inner tail or bag at its rear end, and in the event the trawl-webbing becomes slack with a tendency to pocket, this slackness is taken up by the traction or back pull of the outer tail by a telescopic action thus preventing a pocketing of the trawl-webbing in front of the inner tail or bag 9, and any pocket formed will be at the rear end of the outer tail as shown at 11. As the outer tail 10 is connected to the inner tail 9 at their respective rear ends, any excess drag or traction of the outer tail 10 is taken up and carried by the tow-lines 6 through their connection with the inner tail 9.

The inner tail 9 at all times remains in a fixed position in relation to its distance from the trawl mouth, this fixed position being maintained by the rigid tow-lines 6. Whereas the outer tail 10 is flexible, its position in relation to the distance from the trawl mouth is governed by the flexibility of the trawl-webbing to which it is connected. When the trawl is towed, the pressure of the water against the outer tail and trawl-webbing causes the webbing to flex or stretch rearwardly, and as the webbing stretches, the outer tail's position in relation to its distance from the trawl mouth will change according to the amount of slack or stretching in the trawl-webbing, the outer tail having a tendency to recede and telescope the inner tail and in so doing, will pull the slack net-webbing rearwardly and thereby prevent the net-webbing from pocketing. In order to maintain the forward mouth of the inner tail or bag in a position so as to receive the catch, I use any known method such as the ring 12 connected to the mouth of the tail 9 and bridled to the tow-lines 6 by bridles 13.

At this point I wish to give a brief description of the conventional type of trawl now in use as far as shown in the drawing, so that my improvements may be more readily understood. The present type trawl consists of, and I refer to the drawing, a tow-boat 1, net 2, cork-line 3, lead-line 4, trawl-boards 5, trawl-lines 8, bridles 7, and tail or bag 10. As this type trawl is towed through the water, the trawl-boards 5, spread the mouth of the trawl-net open horizontally, but the tremendous pressure of water against the catch packing up in the closed end of the tail or bag which is connected to and carried by the trawl-webbing, creates a regular sea anchor, causing a great strain on the trawl-boards and thereby reducing their capacity to spread the trawl mouth open horizontally; in fact, sometimes actually reducing the opening of the trawl mouth by from 1/3 to 1/2 according to the amount of strain or back pull on the trawl-boards created by this sea anchor action of the tail or bag. In most of the trawl-nets, the traction of the towing lines is imparted to the rear tail or bag through the trawl meshes. This strain on the meshes partly closes them and thereby interferes with the proper evacuation of water entering the net and increases the resistance to the trawl as it travels through the water.

Another disadvantage of the present type of trawl is that the vertical opening of the trawl mouth is limited to the height of the trawl-boards. The height of the trawl-boards average about 22 inches and as the cork-lines are fastened to the top of the trawl-boards, the pressure of water on the cork-lines as the trawl is towed through the water prevents the cork-lines from rising above this height. Attempts have been made to raise the cork-lines by the use of extra floats, but not with entirely satisfactory results.

From the foregoing description taken in connection with the drawing, the operation of my device will be fully understood and the advantages thereof will be appreciated, but briefly stated the operation is as follows: The tow-lines 6 are attached to the tow-boat 1 and to the inner tail 9, the trawl-boards 5 are attached to the trawl-net 2 at the outer edges of the mouth, and the trawl-lines 8 are attached to the trawl-boards 5 through bridles 7, and in turn are connected to the tow-lines 6, and the net is lowered into the water to assume the position shown in the drawing. As the trawl-net is moved through the water, the trawl-boards assume their position on the sea bottom, spreading the trawl mouth open. The tremendous strain caused by the pressure of water against the trawl, together with the catch packing up in the tail or bag 9, is taken up and carried by the connecting tow lines 6, allowing the trawl-boards to function unhampered in their performance of spreading the trawl mouth open to its fullest capacity.

Transferring the strain created by the weight of the trawl-bag from the trawl-boards 5 to the tow-lines 6, causes the tow-lines to become very rigid and I utilize these rigid tow-lines to raise the cork-line 3 vertically, thus creating a much greater opening at the trawl mouth through which the catch may enter the net. It will be noted that the tow-lines 6 are carried forwardly from the tail of the trawl to the tow-boat on a straight and direct line centrally of the trawl-net, thereby making it less liable to raise the trawl-boards 5 off the ground when the cork-lines 3 are lifted by the tow-lines 6, as would be the case if the tow-lines 6 were carried forward from the tail of the trawl to the tow-boat on indirect lines paralleling the outer edges of the trawl.

Those experienced in trawling have long realized the difficulty to which the trawl-boards are subjected in performing the double function of spreading the trawl mouth open horizontally, while at the same time carrying the weight of the trawl tail. Various attempts have been made to overcome this difficulty, some in the form of support lines, or traction cables extending from the tail or bag forwardly and connecting to the trawl mouth at its outer edges, or to the rear ends of the trawl-boards. I have found through practical experience that the use of support lines or traction cables extending from the tail and connected to the forward part of the trawl, or to the rear end of the trawl-boards, has no effect as far as relieving the strain or drag on the trawl-boards, with the result that the trawl-boards are drawn together laterally just the same as if the load in the tail or bag were carried by the net-webbing.

In my invention, I use the tow-lines 6 directly connecting the tow-boat in a straight line with the tail or bag 9, to carry the tail load. The tow-lines 6 are connected to the trawl-boards 5 and the trawl-mouth through the trawl-lines 8 at a point a material distance forward of the trawl-boards. With this arrangement, the trawl-boards are relieved of the task of carrying the weight of the tail and are allowed to function normally in spreading the trawl mouth open. The tow-lines 6 also accomplish the long sought method of providing a practical means of raising the cork-lines, so as to give the trawl mouth a greater vertical opening. In order to prevent the catch from escaping after entering the trawl, I provide a barrier 14, made of webbing and spaced inside the trawl-net and connected to the trawl-net at its outer ends, and the upper part of the barrier connected to and supported by the webbing on the upper forward part of the net, and having its bottom portion free, and unconnected. When the trawl is towed, the pressure of the water entering the trawl, will swing the unconnected bottom portion of the barrier inwardly so that the catch may enter the trawl and will close when towing ceases during the operation of hauling on board, thereby reducing to a minimum the escape of the entrapped catch.

Having now described my invention, what I claim as new and desire to secure by Letters Patent is:

1. A trawling device including a trawl-net having a lead-line on the lower part of the mouth and a cork-line on the upper part of the mouth, a pair of trawl-boards for opening the mouth of the trawl, a pair of trawl-lines connected to the trawl-boards, and means for increasing the opening of the trawl-mouth horizontally, said means comprising tow-lines connected to the rear of the trawl-net for carrying the weight of the trawl contents thereby relieving the drag on the trawl-boards and allowing them to spread outwardly.

2. A trawling device including a trawl-net having a lead-line on the lower part of its mouth and a cork-line on the upper part of its mouth, a pair of trawl-boards for opening the mouth of the trawl, a pair of trawl-lines connected to the trawl-boards, and means for vertically increasing the opening of the trawl mouth, said means comprising a pair of tow-lines connected to the trawl-lines at a material distance forward of the trawl-boards and connected to the rear end of the trawl-net, the tow-lines becoming rigid and lifting the cork-line vertically when pressure is exerted on the tow-lines.

3. A trawling device including a trawl-net having a lead-line on the lower part of its mouth and a cork-line on the upper part of its mouth, a pair of trawl-boards for opening the mouth of the trawl, a pair of trawl-lines, and a pair of tow-lines connected to the rear end of the trawl to carry the weight of the trawl bag thereby relieving the strain on the trawl-webbing and reducing the resistance to travel by allowing the meshes of said webbing to properly open for the evacuation of the water entering the trawl-net.

4. A trawling device including a trawl-net having a lead-line on the lower part of its mouth and a cork-line on the upper part of its mouth and having an inner tail, a pair of trawl-boards for opening the mouth of the trawl, a pair of trawl-lines connected to the trawl-boards, a pair of tow-lines connected to the inner tail of the trawl-net, and an outer tail connected to the rear of the trawl-net at its forward end and to the inner tail at its rear end, the outer tail pulling the slack webbing rearwardly as the trawl-net is towed thereby preventing pocketing of the webbing in front of the inner tail.

5. A trawling device including a trawl-net, an outer tail connected to the rear of the trawl-net, an inner tail spaced within the outer tail to receive the catch and sealed at its rear to prevent the catch from passing into the outer tail, and tow-lines connected to the inner tail for carrying its load, said inner and outer tails being unattached to each other at their forward ends and having a telescopic fit with each other whereby the pressure of water entering the trawl forces the outer tail rearwardly to prevent pocketing of the trawl-webbing in front of the inner tail when the webbing stretches.

6. A trawling device including a trawl-net, an outer tail connected to the trawl-net for drawing the slack trawl-webbing rearwardly, an inner tail spaced within the outer tail to receive the catch, a cork-line for opening the trawl mouth, tow-lines connected to the inner tail for carrying its load, the tow-lines substantially increasing the opening of the trawl mouth when the trawl is towed, and a net barrier within the trawl-net for substantially reducing the opening of the trawl mouth when towing ceases.

JOHN W. ENRIGHT.